United States Patent
Squyres

[11] Patent Number: 5,860,745
[45] Date of Patent: Jan. 19, 1999

[54] BEARING ASSEMBLY

[76] Inventor: Richard T. Squyres, P.O. Box AA, Ingleside, Tex. 78362

[21] Appl. No.: 838,201

[22] Filed: Apr. 16, 1997

[51] Int. Cl.⁶ ....................................................... F16C 3/00
[52] U.S. Cl. ................................ 384/97; 384/98; 384/906
[58] Field of Search ................................... 384/91, 97, 98, 384/125, 220, 222, 280, 281, 289–291, 295–297, 315, 906

[56] References Cited

U.S. PATENT DOCUMENTS

| | | | |
|---|---|---|---|
| 569,116 | 10/1896 | Morison | 464/183 |
| 1,326,892 | 12/1919 | Reynolds | 384/906 X |
| 1,797,223 | 3/1931 | Annis | 384/97 |
| 2,004,605 | 6/1935 | Moffitt | 384/291 |
| 2,197,883 | 4/1940 | Sinclair | 464/179 X |
| 2,203,039 | 6/1940 | Aker | 384/97 |
| 2,348,274 | 5/1944 | Aker | 384/97 |
| 2,348,275 | 5/1944 | Aker | 384/97 |
| 2,380,715 | 7/1945 | Aker | 384/98 |
| 2,405,799 | 8/1946 | Smeallie | 384/97 |
| 2,538,921 | 1/1951 | Smeallie | 384/97 |
| 2,821,010 | 1/1958 | Vasconi et al. | 384/280 X |
| 3,317,254 | 5/1967 | Satterthwaite et al. | 384/97 |
| 3,725,994 | 4/1973 | Wechsler | 29/447 |
| 4,352,527 | 10/1982 | Sandstrom | 384/125 |
| 5,142,455 | 8/1992 | Squyres | 384/97 |

*Primary Examiner*—Thomas R. Hannon
*Attorney, Agent, or Firm*—G. Turner Moller

[57] ABSTRACT

A bearing includes an annular rubber-like member having a metal sleeve bonded on the inside diameter. One or more collars are sweated onto a shaft and provide one component of a lug and groove torque connection, the metal sleeve providing the other component. In one embodiment, a polymer liner is cooled and then inserted into the stern tube. When the polymer liner warms to ambient temperature, it expands into engagement with the stern tube and provides a surface for bearing engagement with the rubber-like member. Liners of this type are easily removed by removing the bearing, drilling a hole through the side wall of the liner parallel to the axis of the bearing and then pulling the weakened liner from the stern tube.

15 Claims, 1 Drawing Sheet

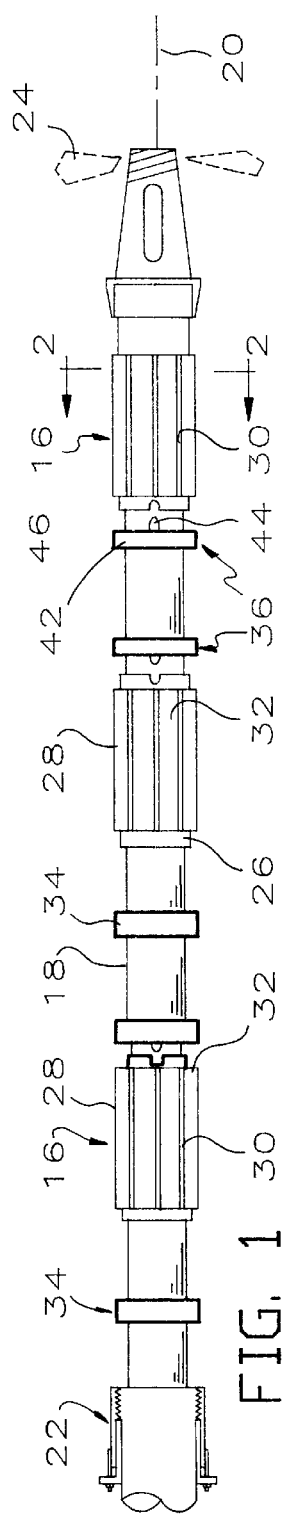
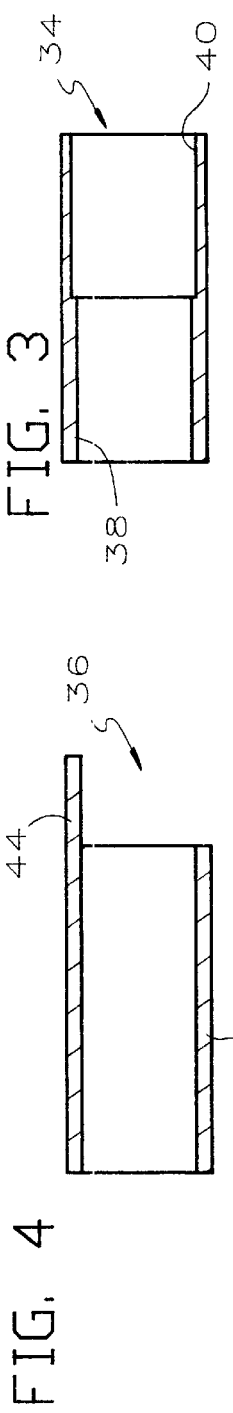
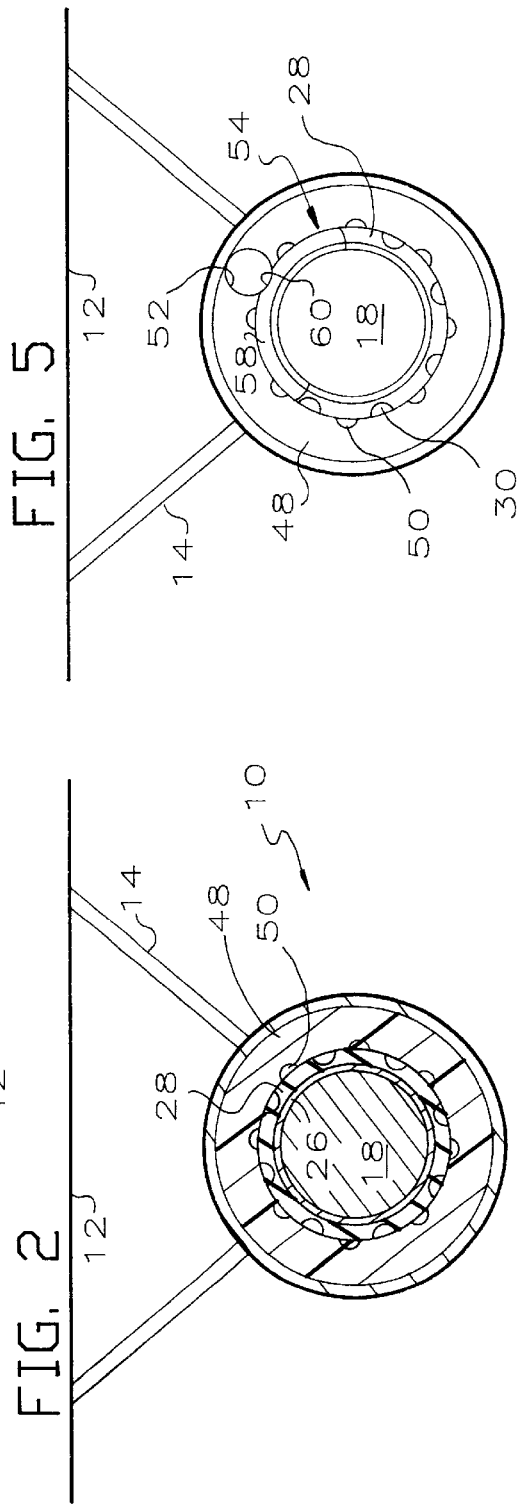

BEARING ASSEMBLY

This invention relates to an improved bearing assembly and more particularly to an improvement over a conventional Cutlass bearing and/or a bearing having an annular rubber member on the outside of a rigid sleeve.

BACKGROUND OF THE INVENTION

Cutlass bearings have been the standard of use in several applications, some of which are marine and some of which are not. The typical marine application is journalling the propeller shaft of a fairly large boat or ship for rotation inside a stern tube. A typical non-marine application is journalling the driven shaft of a mud motor used to drill deviated or horizontal wells in the oil field.

A standard Cutlass bearing is a relatively long annular rubber member rotatably receiving a shaft through an opening in the center. The rubber member typically has slots or grooves on the interior surface to allow water to pass axially through the bearing to cool and lubricate it. The bearing typically includes a cylindrical metal sleeve secured in some fashion to the stern tube. The rubber member is typically bonded to the metal sleeve. Cutlass bearings have been used for decades in marine applications and have been used in mud motors for about as long as mud motors have been in existence.

Standard Cutlass bearings have a variety of disadvantages, some of which are remedied, or partially remedied, by reversing the situation, i.e. placing the rubber sleeve on the outside of the metal tube and fixing the metal tube to the shaft being journalled so the rubber sleeve rotates against the stern tube. Bearings of this general type have been proposed in the prior art as shown in U. S. Pat. Nos. 2,203,039; 2,348,274; 2,348,275; 2,380,715; 2,405,799; 2,538,921 and 5,143,455. It is this type device to which this invention most nearly relates.

Analysis of standard Cutlass bearings and reversed Cutlass bearings show they are defective in several respects.

SUMMARY OF THE INVENTION

In this invention, reverse Cutlass bearings are mounted for rotation with the shaft by the provision of one or more collars frictionally fixed onto the exterior of the shaft. This is known in the art as "sweating" where the collar is heated so its passage becomes large enough to pass over the shaft. When the collar cools down to ambient, it shrinks onto the exterior of the shaft and is thereby frictionally fit in a secure, stable fashion. The collar provides one component of a mating torque connection, such as a tongue and slot that drivably connects with an inner rigid sleeve comprising part of the bearing.

It is desirable to provide a liner on the inside of the stern tube in marine applications for engagement with the rubber-like bearing material of the reverse Cutlass bearings. In this invention, a polymer liner is frictionally fit in the stern tube. The liner is cooled to shrink it, slipped over the shaft into the proper position and allowed to warm up to ambient temperature. The liner expands into a frictional fit with the stern tube. The reverse Cutlass bearings are then inserted onto the shaft to a position where they contact the liner.

In marine applications, it is very desirable to have the capability of removing old bearings and installing new bearings without removing the shaft, particularly in shafts having multiple axially spaced bearings. In this invention, the frictionally fit liners are removed by drilling a passage through the side wall of the liner in a direction parallel to the shaft. The collars are then removed and the weakened liners are then pulled out of the stern tube.

One object of this invention is to provide an improved reverse Cutlass type bearing and an improved technique for rotating the bearing in response to rotation of the shaft.

Another object of this invention is to provide an improved multiple bearing and drive connection assembly.

Another object of this invention is to provide an improved bearing and liner and an improved technique for replacing the bearing and liner without removing the shaft which is journalled by them.

These and other objects of this invention will become more fully apparent as this description proceeds, reference being made to the accompanying drawing and appended claims.

BRIEF DESCRIPTION OF THE DRAWINGS

FIG. 1 is plan view of a marine propeller shaft having multiple bearings, liners and drive connections thereon, certain parts being separated for clarity of illustration;

FIG. 2 is an enlarged cross-sectional view of the shaft of FIG. 1 positioned inside a stern tube and taken along line 2—2 of FIG. 1 as viewed in the direction indicated by the arrows;

FIG. 3 is a cross-sectional view of one type of sweat collar used in this invention;

FIG. 4 is a cross-sectional view of another type of sweat collar used in this invention; and FIG. 5 if an enlarged cross-sectional view similar to FIG. 2 illustrating one step in the removal of a worn liner and bearing.

DETAILED DESCRIPTION

Referring to FIGS. 1–2, there is illustrated a conventional stern tube 10 supported from the hull 12 of a boat or ship by one or more struts 14. The stern tube 10 includes one or more water scoops (not shown) arranged to direct water through the stern tube 10 in response to forward movement of the boat through the water in order to cool and lubricate a plurality of bearings 16 mounting a propeller shaft 18 for rotation about an axis 20 inside the stern tube 10. The forward end of the stern tube 10 is inaccessible from the rear of the boat because of the hull 12. The propeller shaft 18 extends through suitable packing 22 in the stern tube 10 and connects to a propeller 24 in a more-or-less conventional manner. For a more detailed view of a boat stern, stern tube and propeller, reference is made to U.S. Pat. No. 5,143,455, the disclosure of which is incorporated herein by reference.

The bearing 16 comprises a rigid sleeve 26 having an ID slightly larger than the OD of the propeller shaft 18. As will be apparent hereinafter, the rigid sleeve 26 is not shrunk fit onto the propeller shaft 18 and does not have to be made to difficult tolerances, given the variation in shaft diameter that exists in practice. In most applications, the rigid sleeve 26 is metal and typically is of stainless steel to resist corrosion in a marine environment. A sleeve 28 of rubber-like bearing material is bonded to the rigid sleeve 26. The rubber-like material is of a conventional type and varies in hardness from one application to another, usually from about 65–90 Durometer. Preferably, the rigid sleeve 26 is somewhat longer than the rubber sleeve 28 to provide ends extending beyond the end of the rubber sleeve 28.

After the material of the rubber sleeve 28 cures or hardens, a plurality of axially extending grooves 30 are conventionally machined in the external surface of the sleeve 28 leaving raised lands 32 between adjacent grooves 30. As will be appreciated, the lands 32 provide the bearing surface between the bearing 16 and the stern tube 10 while water passes through the grooves 30 to cool and lubricate the bearing 16 and flush any granular particles, such as sand or silt, out of the bearing 16. As shown in FIG. 1, the grooves 30 are straight, but may be inclined to the axis 20.

An important feature of the grooves 30 is they extend completely to the end of the rubber sleeve 28 and are rather large to provide a more-or-less straight through liquid path across the rubber sleeve 28. Because the bearing 16 rotates with the shaft 18, the edges of the grooves 30 act much like pump impellers to move liquid relative to the surrounding sleeve and thus tend to keep a film of water between the rubber sleeve 28 and the surrounding stern tube 10. It will accordingly be seen that the bearings 16 are essentially like those disclosed in U.S. Pat. No. 5,143,455.

The bearing 16 is connected to the propeller shaft 18 for rotation therewith. To this end, one or more collars 34, 36 are provided. As shown in FIG. 3, the collars 34 include a section 38 of reduced internal diameter that ultimately will grip the shaft 18 and a section 40 of somewhat larger internal diameter. The section 38 is sized so that when the collar 34 is heated, the internal diameter of the section 38 is slightly larger than the external diameter of the shaft 18. In the heated condition, the collar 34 is passed over the shaft 18 to a desired position. On cooling to ambient temperature, the section 38 shrinks to be frictionally fixed on the shaft 18 for rotation therewith. This technique is known in the art as shrink fitting or sweating. The section 40 is of somewhat larger internal diameter to receive the end of the rigid sleeve 26 so the collar 34 acts as a stop to prevent axial movement of the bearing 16 in the direction of the collar 34 which is known as a stop collar.

As shown in FIG. 4, the collar 36 acts to drive or rotate the bearing 16 and is thus a drive collar. The drive collar 36 comprises a tubular section 42 similar in size to the section 38 and having an internal diameter of a size to be sweated onto the exterior of the shaft 18. The drive collar 36 also comprises a tongue or lug 44 of a size and shape to be received in a slot 46 provided by the rigid sleeve 26 of the bearing 16. After installation of the stop collar 34 nearest the packing 22, the bearing 16 is passed over the shaft 18 so the end of the sleeve 26 passes into the large ID section 40 of the stop collar 34. The innermost drive collar 36 is then heated until it expands sufficiently to pass over the shaft 18. The heated drive collar 36 is then passed over the shaft 18 so the lug 44 engages the slot 46 in a driving relation. It will accordingly be seen that the lug 44 and slot 46 provide a mating torque transmitting connection sufficient to rotate the bearing 16 in response to rotation of the shaft 18. It will be apparent that the drive collar 36 also acts to prevent movement of the bearing 16 in the direction of the drive collar 36 and thus has a stop collar function. It will accordingly be seen that the collars 34, 36 captivate the bearing 16 in a predetermined position. It will also be apparent that drive collars 36 may be provided on both ends of the bearing 16, providing drive lugs 44 in engagement with slots on both ends of the sleeve 26. The intermediate bearing 16 is installed next followed by the bearing 16 nearest the propeller 24. Because the innermost end of the drive shaft 18 is inaccessible, all work is done through the open or propellar end of the stern tube 10.

In one embodiment of the invention, the bearing sleeve 28 may rotate directly on the inside of the stern tube 10. In a preferred embodiment of the invention shown in FIGS. 2 and 5, a liner 48 is provided for each of the bearings 16. The liner 48 includes a series of axial slots or grooves 50 which cooperate with the grooves 30 in the bearing sleeve 28 to pass water between the sleeve 28 and liner 48. The liner 48 is preferably a low friction, abrasion resistant material which has a sufficiently high temperature coefficient of expansion to allow the liner 48 to be cooled sufficiently to pass inside the stern tube 10 to a desired axial position and then warmed into a stable, secure frictional fit with the stern tube 10. Although many materials are suitable, a preferred material is an organic polymer bearing material known in the trade as Uniroyal LF60 with a 66D Durometer available from Uniroyal Corporation. This material has a thermal coefficient of expansion similar to a metal.

Installation of each of the bearings 16 of this invention preferably follows the following sequence. First, the stop collar 34 is frictionally fixed to the shaft 18 at a desired location. Next, the liner 48 is placed inside the stern tube 10 juxtaposed to the stop collar 34. The bearing 16 is then passed over the shaft 18 and received in the stop collar 34. Last, the drive collar 36 is installed.

In use, the propeller shaft 18 is turned by the boat engine (not shown) so the bearing 16 rotates inside the stern tube 10. As the boat moves forwardly in the water, water enters the scoop or scoops (not shown), passes axially through the inside of the stern tube 10 until reaching the bearing 16. The water then passes through the grooves 30 and over the lands 32 as the bearing 16 rotates with the shaft 18 thereby lubricating the bearing surface between the lands 32 and either the interior of the stern tube 10 or, as in FIG. 2, between the lands 32 and the liner 48.

Referring to FIG. 5, another feature of this invention is illustrated. When the bearings 16 and/or liners 48 become worn, they may be removed and replaced without removing the propeller shaft 18 from the stern tube 10. This is very desirable because it means that the bearings and liners may be replaced without taking the boat from the water. Instead, the aft end of the boat may be raised out of the water to expose the propeller 14 and end of the stern tube 10.

The propeller 24 is removed in a conventional manner and the end stop collar 34 is pulled. A long extension bit drill is used to drill a hole or passage 52 through the side wall of the liner 48 in a direction generally parallel to the axis 20. If necessary, a long mandrel or bit support 54 is provided having a bottom surface of the same curvature as the shaft 18. The upper surface 58 of the mandrel 54 provides a groove 60 for guiding and/or supporting the drill bit. In the alternative, the hole 52 may be formed with a round hot rod pushed into the liner 48. The mandrel 54 and bearing 16 are then removed, leaving the weakened liner 48 unsupported. The liner 48 may then be collapsed and removed easily. After the end bearing 16 and liner 48 are removed, the intermediate or next adjacent bearing 16 and liner 48 are removed until all of the bearings and liners have been removed from the shaft 18. Then, new bearings and liners may be installed in a more-or-less reverse procedure.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. In combination, a housing having a passage therethrough providing an exposed end and an inaccessible end, a shaft extending through the passage having a first end exposed through the exposed passage end, and a bearing mounting the shaft for rotation relative to the housing including a first rigid sleeve surrounding the shaft and providing a first component of a mating torque connection, means captivating the first sleeve on the shaft for rotation therewith, a second annular sleeve of resilient rubber-like material around the first sleeve and affixed thereto having a plurality of spaced parallel grooves providing lands therebetween, the improvement comprising:

a collar, friction fit on the shaft, providing a second component of the mating torque connection in driving engagement with the first connection.

2. The combination of claim 1 wherein the mating torque connection is a tongue and slot.

3. The combination of claim 2 wherein the first sleeve provides a slot opening through an end thereof, the first component of the mating torque connection comprising the slot.

4. The combination of claim 1 further comprising a second bearing mounting the shaft for rotation relative to the housing including a third rigid sleeve surrounding the shaft and providing a first component of a second mating torque connection, means captivating the third sleeve on the shaft for rotation therewith, a fourth annular sleeve of resilient rubber-like material around the third sleeve and affixed thereto having a plurality of spaced parallel grooves providing lands therebetween, and a second collar friction fit on the shaft providing a second component of the second mating torque connection in driving engagement with the first connection of the second mating torque connection.

5. The combination of claim 4 wherein the means captivating the third sleeve on the shaft for rotation therewith comprises a stop collar friction fit on the shaft providing an abutment engaging the third sleeve and preventing axial movement thereof toward the stop collar.

6. The combination of claim 5 wherein the stop collar comprises a receptacle for receiving an end of the third sleeve.

7. The combination of claim 1 further comprising a polymer liner in the passage in bearing engagement with the second sleeve.

8. The combination of claim 7 wherein the polymer liner is friction fit in the passage.

9. The combination of claim 1 wherein the means captivating the first sleeve on the shaft for rotation therewith comprises a stop collar friction fit on the shaft providing an abutment engaging the first sleeve and preventing axial movement thereof toward the stop collar.

10. In combination, a housing having a passage therethrough providing an exposed end and an inaccessible end, a shaft extending through the passage having a first end exposed through the exposed passage end, first and second bearings spaced axially along the shaft and mounting the shaft for rotation relative to the housing, each of the bearings including a first rigid sleeve surrounding the shaft and providing a first component of a mating torque connection, means captivating the first sleeve on the shaft for rotation therewith, and a second annular sleeve of resilient rubber-like material around the first sleeve and affixed thereto having a plurality of spaced parallel grooves providing lands therebetween, first means insertable through the passage and affixed to the shaft for transmitting torque from the shaft to the first sleeve of the first bearing; and second means insertable through the passage and affixed to the shaft for transmitting torque from the shaft to the first sleeve of the second bearing.

11. The combination of claim 10 wherein the first means includes a collar friction fit on the shaft.

12. The combination of claim 11 wherein the second means includes a second collar friction fit on the shaft.

13. The combination of claim 12 wherein the shaft provides a smooth exterior.

14. The combination of claim 10 further comprising a polymer liner in the passage in bearing engagement with the second sleeve.

15. The combination of claim 14 wherein the polymer liner is friction fit in the passage.

* * * * *